US006249679B1

United States Patent
Guilbaud et al.

(10) Patent No.: US 6,249,679 B1
(45) Date of Patent: Jun. 19, 2001

(54) TELECOMMUNICATIONS SYSTEM, LOCATION METHOD AND MOBILE STATION FOR SUCH A SYSTEM

(75) Inventors: Yvan Guilbaud, St. Herblain; Franck Legoupil, Le Mans, both of (FR)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/119,889

(22) Filed: Jul. 21, 1998

(30) Foreign Application Priority Data

Sep. 30, 1997 (FR) .................................. 97-12148

(51) Int. Cl.⁷ .................................................. H04Q 7/20
(52) U.S. Cl. ........................ 455/456; 455/422; 455/440
(58) Field of Search .................................. 455/33.1, 33.2, 455/56.2, 56.1, 421, 440, 441, 456, 457, 422, 517, 550, 556, 575, 429, 436, 404, 434; 342/450, 457, 357

(56) References Cited

U.S. PATENT DOCUMENTS

| 5,384,824 | * | 1/1995 | Alvesalo | 379/59 |
| 5,394,158 | * | 2/1995 | Chia | 342/457 |
| 5,634,193 | * | 5/1997 | Chisler | 455/33.2 |
| 5,669,061 | * | 9/1997 | Schipper | 455/429 |
| 5,713,073 | * | 1/1998 | Warsta | 455/56.1 |
| 5,809,424 | * | 9/1998 | Eizenhoefer | 455/456 |
| 5,832,394 | * | 11/1998 | Wortham | 701/1 |
| 5,946,611 | * | 8/1999 | Dennison et al. | 455/404 |
| 6,021,330 | * | 2/2000 | Vannucci | 455/456 |
| 6,038,444 | * | 3/2000 | Schipper et al. | 455/421 |
| 6,049,715 | * | 4/2000 | Willhoff et al. | 455/436 |

OTHER PUBLICATIONS

Draft Prets 300 557: May 1995 (GSM 04.08 Version 4.11.0) p. 81–90.

* cited by examiner

Primary Examiner—Daniel Hunter
Assistant Examiner—Pablo Tran
(74) Attorney, Agent, or Firm—Dicran Halajian

(57) ABSTRACT

The invention relates to a radio transmission system comprising base radio stations (3) which form a radio coverage area (1) in which a mobile station (4) is suitable for supplying to the system a position indication thanks to a location method. If a location attempt fails at a given instant, the mobile station (4) having an insufficient radio coverage at that instant can no longer receive any communication during a certain period of time. The invention provides to shorten this period of time by equipping the mobile with means for evaluating the quality of the radio coverage experienced by the mobile station and for automatically starting a new location attempt the moment the quality of the radio coverage is sufficient.

24 Claims, 2 Drawing Sheets

TELECOMMUNICATIONS SYSTEM, LOCATION METHOD AND MOBILE STATION FOR SUCH A SYSTEM

FIELD OF THE INVENTION

The invention relates to a radio transmission system having a radio coverage area in which area the transmission system is suitable for exchanging radio signals with at least one mobile station, comprising:

location means including a first control for carrying out a current location of the mobile station in the radio coverage area at given instants, measuring means for measuring at least one receiving quality parameter of the radio signals for producing a quality level linked with this parameter.

The invention also relates to a location method of locating a mobile station in a coverage area of a radio transmission system, the method comprising location steps initiated by the mobile station to indicate to the system its position in the coverage area at given instants.

The invention finally relates to a mobile station of a radio transmission system having a coverage area in which said station and the system can exchange radio signals which have a measurable receiving quality, said station comprising location means for indicating to the system its position in the coverage area, and measuring means for measuring said receiving quality.

The invention applies to all radio telecommunications systems and, more particularly, to cellular telephony systems operating according to the GSM standard (Global System for Mobile communications), NMT standard (Nordic Mobile Telephone), DCS1800 standard (Digital Communication System operating at 1800 MHz), PCS1900 standard (Personal Communication System operating at 1900 MHz) etc.

BACKGROUND OF THE INVENTION

The cellular architecture of these systems implies location procedures for applying data about the current position of the mobile stations which are connected to the system to a central element so that this system can efficiently lead the communications to the destination stations. For this purpose, the central element manages a list of mobile stations called "system-connectable" so as to identify the stations capable of receiving communications.

As these location procedures generate a considerable amount of traffic on the radio channels, it is necessary to initiate them the least possible so as not to saturate the system.

Recommendation ETS 300 557 of ETSI (European Telecommunications Standards Institute) for the GSM standard states criterions for optimizing the management of these location procedures.

According to this Recommendation, when a location attempt fails due to the fact that the radio coverage is too weak to establish a connection (a case of RANDOM_ACCESS_FAILED), the mobile station is placed in a state called IDLE_NOT_UPDATED in which it is considered unconnectable by the system. Indeed, at the instant at which the location attempt has failed, the mobile station was in an area where the radio coverage was insufficient for the mobile station to establish a radio connection of good quality for receiving communications. The IDLE_NOT_UPDATED state is then assigned thereto to avoid a saturation of the system by the transmission of communications which have a very slim chance of reaching the destination.

The mobile station thus remains in the IDLE_NOT_UPDATED state until one of the following three events happens:

the mobile station changes cell, a periodic location timer expires (this is the T3212 defined in the cited Recommendation), the mobile station twice tries to establish a communication.

The role of the periodic timer is to confirm to the system every T3212×6 minutes via a periodic location the presence of the mobile station in the same geographical area. If the station changes its geographical area, a normal type of location is initiated. In case of a failure of a periodic location, the system considers the mobile turned off or unconnectable and removes the station from the list of connectable stations until a location is carried out successfully.

Thus, according to said Recommendation the periodic timer may expire between 6 minutes and 24 hours after being switched on depending on the coverage area. This implies that in highly unfavorable cases the base station is located in an area of poor coverage with shadowy areas and that neither of the other two events occurs before the periodic timer expires, the mobile station may continue to be unconnectable for several hours, which may be highly detrimental.

However, during this period of time, the mobile station may have been in a position to move without changing cell so as to benefit from a sufficient coverage for the transmission of a communication. But, since no location procedure has been initiated, according to the cited Recommendation the mobile station is still in the IDLE_NOT_UPDATED state, the system does not know the current position of the mobile station and is thus incapable of transmitting a communication to the mobile station.

SUMMARY OF THE INVENTION

It is an object of the invention to provide means for largely remedying the drawbacks left by Recommendation ETS 300 557 while defining a new condition for initiating a location procedure in the system.

Therefore, a radio transmission system as mentioned in the opening paragraph is characterized in that the location means comprise a second control activated by a decision element which co-operates with said measuring means for initiating a location called special location as a function of measured quality levels.

The new condition which is suitable for generating a location procedure thus depends on the receiving quality of the radio signals transmitted to the mobile station via the system. The decision element thus permits of initiating a special location as a function of the measured quality (special location because this is not foreseen by the standard) which location will very likely succeed.

Compared with the cited Recommendation, the invention provides the great advantage of permitting a mobile station which is reputedly unconnectable by the system to become connectable the moment it receives sufficient radio coverage that is sufficient for the mobile station to be located. Therefore, a system of the type mentioned above is provided in which the decision element comprises detection means for detecting a failure of a current location, characterized in that the triggering of the second control is determined by the detection of a failure of a current location (RANDOM_ACCESS_FAILED according to the cited standard, this failure putting the mobile station in the IDLE_NOT_UPDATED state).

With regard to a location method of the type defined in the opening paragraph, the invention provides that if a location step fails at a given instant, the mobile station having at that instant a radio coverage that does not satisfy a predefined condition called radio quality condition (that is to say, that the coverage seen from the mobile station is insufficient for establishing a connection), a new location step is automatically triggered when a coverage signal is detected indicating to the mobile station that said condition is satisfied.

Indeed, the radio coverage seen by the mobile station at a given instant may be insufficient for establishing a connection despite the fact that a quality criterion as defined in the standard used may be satisfactory. For remedying this drawback, the method provides to define a new quality condition which is compatible with the quality criterion defined in the standard for starting a location.

The invention also relates to a mobile station capable of implementing such a method. Therefore, a mobile station as defined in the opening paragraph is characterized in that it additionally comprises a control element for starting a location as a function of the results of said measurements.

The invention is highly advantageous, notably in mountainous regions and in the open field where the coverage area has shadowy areas, that is to say, areas outside the coverage of the radio system in which areas a location is impossible. Indeed, the investment in infrastructures necessary for correctly covering these areas is too high compared with the expected profitability, given the difficulties of transmission due to the relief and/or the sparse population.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENTS

Figure 1:
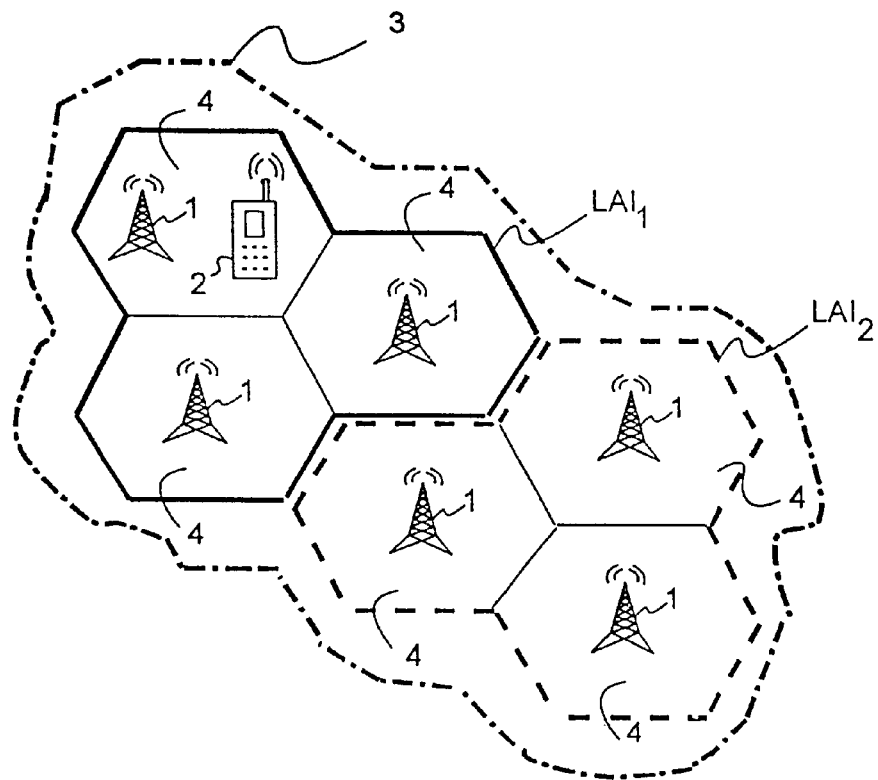
FIG. 1 represents an example of a system according to the invention.

FIG. 1 represents the architecture of a radio sub-system of the GSM type functioning in accordance with the Recommendation ETS 300 557. Here is an example of one of the systems in which the invention may advantageously be utilized.

This system is formed by a network of base radio stations 1, called base stations, whose role is to establish the radio interface between the system and the mobile stations 2 called mobiles, which are connected to the network. The network of base stations has a radio coverage which covers a geographical area 3 divided into cells 4, each cell 4 being covered by a base station 1. The mobile 2 may move freely from one cell to another while being connectable via the base stations which cover these cells.

A central element manages data files containing data on the current position of each mobile so as to, for example, direct the calls to the destination mobile. These data enable the system to know the position of the mobiles in a certain geographical area called location area with a spatial precision that varies from a single cell to a set of various cells.

In the example of the Figure, the coverage area 3 of the system is divided into two location areas $LAI_1$ and $LAI_2$ containing three cells each.

The base stations 1 continuously broadcast data among them and also to their environment such as, for example, a Location Area Identifier LAI and a Base Station Identifier BSI. Thanks to the LAI the mobile knows the location area to which the base station belongs with which it is in conversation. If the mobile detects a change of LAI simultaneously with a change of BSI, a location control called current location control or "normal" location control is activated and starts a location procedure for updating the data that relate to its current position with respect to the network, so that the system can direct its calls to the new location area of the mobile. The location control called current location control is also activated to carry out a periodic type of location, and with each switching on of the mobile if the system requires this, for an "IMSI attach" type of location which specifies that the mobile is switched on and connectable.

In certain cases, the location attempt fails because of insufficient coverage; that is to say, that the quality of the radio signal received by the mobile 2 is insufficient to permit a dialogue with the base station 1. This is often due to too low receiving power of the radio signals received by the mobile. This parameter will be restricted to for the rest of the description, but other parameters called radio quality may also be responsible for a location failure; such as, for example, too high a transmission error rate or any other quality parameter significant for the system used.

For the GSM standard, a current case of failure is defined in the cited Recommendation and is labeled RANDOM_ACCESS_FAILED. A mobile which has been unsuccessful at establishing a radio connection for it being located as a result of too little coverage reveals itself in the RANDOM_ACCESS_FAILED state and repeats the location attempt up to 8 times. If none of these attempts is successful, the mobile is automatically placed in the IDLE_NOT_UPDATED state and becomes unconnectable by the network because the latter does not know its current position.

According to the invention the mobile triggers a special location control when at least one of the four following events occurs:

the mobile changes cell, a periodic location timer expires (the T3212 is concerned), the mobile attempts to establish a communication, the mobile sees the power level of its current cell reach a threshold that is estimated to be sufficient for a location attempt to be repeated.

According to the preferred embodiment of the invention a special location control is then started with a detection of a signal called coverage signal indicating that the mobile sufficiently receives radio power from a base station for a location attempt.

According to the GSM standard the mobile very frequently measures the power level of the radio signals it receives from the network to select the best available frequency channels for communication. These measurements are stored in the random access memory in the mobile and are regularly updated.

The invention provides that the special location control is started on the basis of these measuring results. For example, a power threshold may be defined of which the detection by a decision element of the microprocessor type automatically triggers the special location control. The microprocessor thus controls the measuring results and triggers the control when a result higher than or equal to a predefined threshold is detected. Also the variations of measured power levels may be monitored and a variation amplitude defined, that is to say, a value of a power jump of which the detection by an associated jump detection device triggers the special location control. Other equivalent means utilizing these measuring results for triggering a location may be considered without leaving the scope of the invention.

Figure 2:
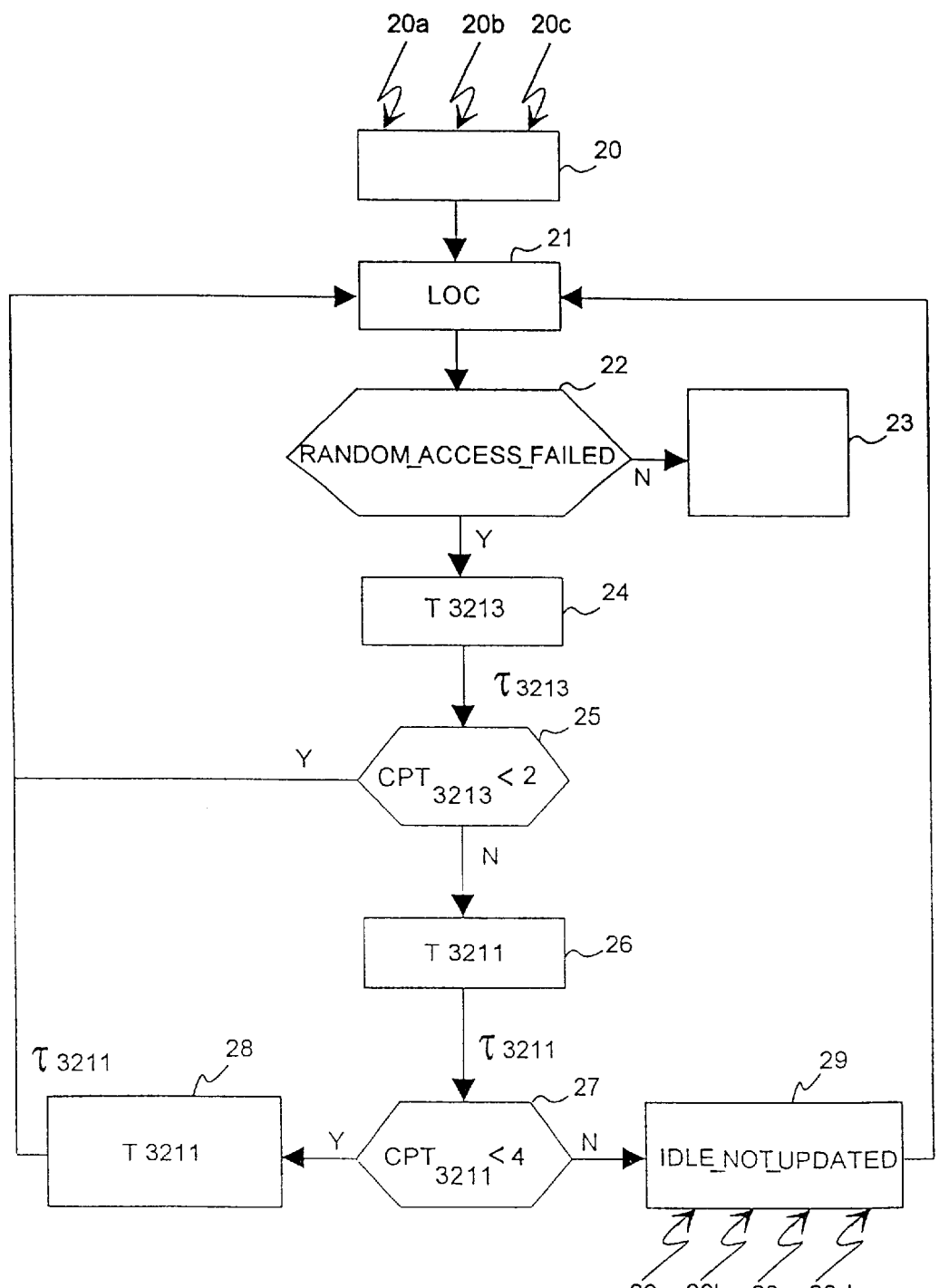
FIG. 2 represents an example of a location method according to the invention.

FIG. 2 represents an example of a method according to the invention which may be implemented in a mobile station of the system represented in FIG. 1.

The method starts with box 20, the mobile is in an arbitrary state. The detection of at least one of the three events represented by broken arrows pointing at box 20 triggers the control called current location control after:

- a change of LAI (20a, triggering of a normal type of location),
- an expiration of the timer T3212 (20b, triggering of a periodic type of the location) or also
- a switching-on of the mobile if the system requires this (20c, triggering of an "IMSI attach" type of location).

The method then goes to step 21 (LOC) for carrying out the equivalent location procedure as a function of the event that triggers this.

In box 22, the result of step 21 is tested and in particular the detection of case of RANDOM_ACCESS_FAILED.

If the result of the test is negative (N), the mobile carries out the conventional processing provided by the GSM standard in box 23 and the specification of the manufacturer as a function of the location procedure that has been carried out.

If the result is positive (Y), that is to say, the location has failed in a case of RANDOM_ACCESS_FAILED, a timer T3213 is set in box 24.

At its expiration, after a period of time $\tau_{3213}$, in box 25 is tested the state of a counter $CPT_{3213}$, to know the number of consecutive expirations of the timer ($CPT_{3213} < 2$).

If this number is strictly lower than 2 (Y), the method is resumed in box 21 to try a location again.

If not (N), box 26 is proceeded to to set another timer denoted T3211. When the timer T3211 expires after a period of time $\tau_{3211}$, the number of consecutive expirations of this timer ($CPT_{3211} < 4$) is tested.

If this number is strictly lower than 4 (Y), the method is proceeded in box 28 with a new setting of the timer T3211. When this timer expires, the method is resumed with box 21 to start a location procedure again.

If the number of consecutive expirations of this timer reaches or exceeds 4 (N), step 29 is proceeded to where the mobile is put in the state IDLE_NOT_UPDATED. The position of the mobile then being unknown to the network, the mobile cannot receive an incoming call. The mobile remains in this state until one of the four events provided by the invention and represented by broken arrows pointing at box 29 occurs:

- 29a for the expiration of the timer T3212,
- 29b for a change of a current cell,
- 29c for an outgoing call and
- 29d for the detection of a coverage signal indicating that the coverage quality is sufficient (for example, the receiving power of the radio signals coming from a base station has reached a predefined threshold).

If one of these events occurs, the special location control is triggered and the method then returns to step 21 for carrying out a location.

Figure 3:
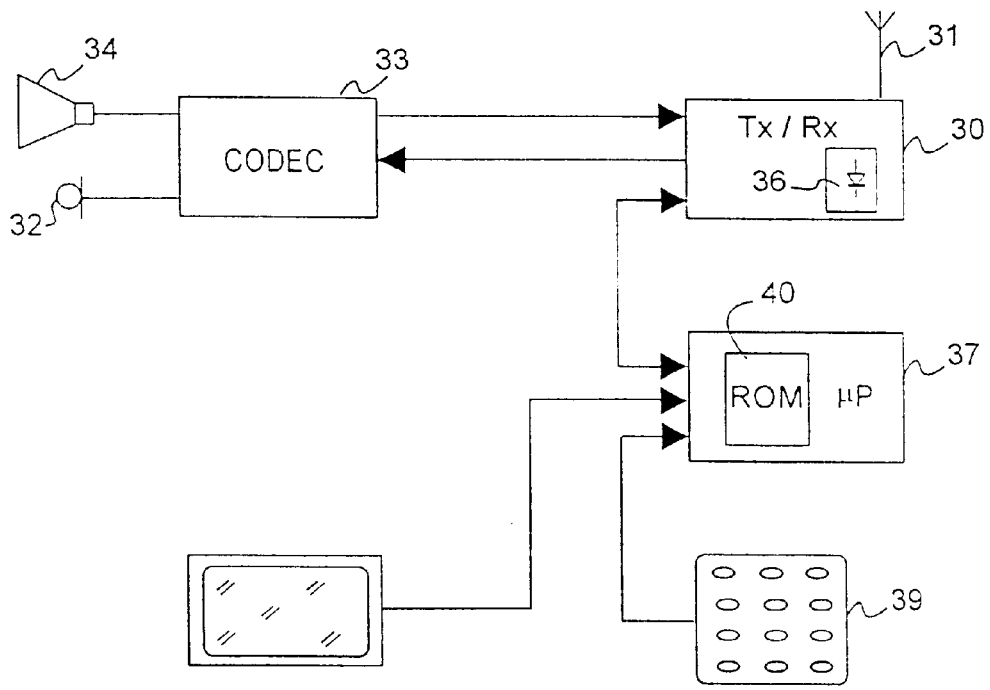
FIG. 3 represents a block diagram of a mobile station according to the invention.

FIG. 3 represents a general block diagram of a radio telephone such as the one referenced 2 in FIG. 1. It comprises transceiving circuits (Tx/Rx) 30 coupled to an antenna 31. The transmission circuit Tx is connected to a microphone 32 via a speech coding circuit (CODEC) 33. The receiving circuit Rx is connected to a loudspeaker 34 via the circuit 33 and includes measuring means for measuring the receiving power of the radio signals captured by the antenna 31. These means comprise at least a threshold detection device 36 or a power jump detection device to inform a control element 37 of the power level of the received signals and possibly trigger a special location control. The operations of the radio telephone are checked by the element 37 which comprises a microprocessor $\mu P$ for carrying out the processing of the signals transmitted and received by the circuits 30 and those coming from a user interface formed by a display 38 and a keyboard 39. The element 37 also comprises a non-volatile memory 40 of the ROM type (Read-Only Memory) to store the operation program of the telephone carried out by the microprocessor. The invention may be embodied by modifying this program so as to integrate therein the location method described with reference to FIG. 2.

A telecommunications system, a location method and a mobile station of such a system have just been described by way of examples to permit said mobile station to receive incoming calls the moment its radio coverage is satisfactory. The invention is highly advantageous in the regions where the coverage offers poor reception areas which give rise to frequent location failures. Roughly speaking, the proportion of mobile stations that can be connected by the system at a given instant has augmented thanks to the invention.

What is claimed is:

1. A radio transmission system for exchanging radio signals with a mobile station in a radio coverage area, comprising:

location means for determining a current location of the mobile station in the radio coverage area at given instants in response to a first factor;

measuring means for measuring quality levels of at least one received quality parameter of the radio signals;

wherein said location means further determines said current location as a function of said quality levels, so that said mobile station is capable of exchanging said radio signals when said quality levels are acceptable; and a decision element which compares said quality levels with a predetermined level, and activates said location means when said quality levels are above said predetermined level.

2. The radio transmission system of claim 1, wherein said quality levels are acceptable when one of said quality levels are above a first predetermined level and variations of said quality levels are above a second predetermined level.

3. The radio transmission system of claim 1, wherein said measuring means comprise a detection device for detecting a jump in said quality levels.

4. The radio transmission system of claim 1, wherein said at least one received quality parameter of the radio signals is a received power of said radio signals.

5. A radio transmission system for exchanging radio signals with a mobile station in a radio coverage area, comprising:

location means for determining a current location of the mobile station in the radio coverage area at given instants in a response to a first factor;

measuring means for measuring quality levels of at least one received quality parameter of the radio signals;

wherein said location means further determines said current location as a function of said quality levels, so that said mobile station is capable of exchanging said radio signals when said quality levels are acceptable; and a decision element which compares variations of said quality levels with a predetermined level, and activates said location means when said variations are above said predetermined level.

6. The radio transmission system of claim 5, wherein said quality levels are acceptable when one of said quality levels are above a first predetermined level and variations of said quality levels are above a second predetermined level.

7. The radio transmission system of claim 5, wherein said measuring means comprise a detection device for detecting a jump in said quality levels.

8. The radio transmission system of claim 5, wherein said at least one received quality parameter of the radio signals is a received power of said radio signals.

9. A radio transmission system for exchanging radio signals with a mobile station in a radio coverage area, comprising:
   location means for determining a current location of the mobile station in the radio coverage area at given instants in response to a first factor;
   measuring means for measuring quality levels of at least one received quality parameter of the radio signals;
   wherein said location means further determines said current location as a function of said quality levels, so that said mobile station is capable of exchanging said radio signals when said quality levels are acceptable; and
   a decision element which compares said quality levels with a predetermined level, said decision element including detection means for detecting a current location failure, wherein triggering of said location means to determine said current location as said function of said quality levels is influenced by the detection of the current location failure.

10. The radio transmission system of claim 9, wherein said quality levels are acceptable when one of said quality levels are above a first predetermined level and variations of said quality levels are above a second predetermined level.

11. The radio transmission system of claim 9, wherein said measuring means comprise a detection device for detecting a jump in said quality levels.

12. The radio transmission system of claim 9, wherein said at least one received quality parameter of the radio signals is a received power of said radio signals.

13. A method for locating mobile station in a radio coverage area of a telecommunication system comprising:
   determining a current location of the mobile station in the radio coverage area at given instants in response to a first factor;
   measuring quality levels of at least one received quality parameter of the radio signals;
   determining said current location as a function of said quality levels, so that said mobile station is capable of exchanging said radio signals when said quality levels are acceptable; and
   detecting a current location failure, and in response to the detecting act, performing the determining act that determines said current location as said function of said quality levels.

14. The method 13, wherein said at least one received quality parameter of the radio signals is a received power of said radio signals.

15. The method of claim 13, wherein the determining act that determined said current location as said function of said quality levels is performed when one of said quality levels are above a first predetermined level and variations of said quality levels are above a second predetermined level.

16. A mobile station of a radio transmission system having a radio coverage area for exchanging radio signals with further stations, comprising:
   location means for determining a current location of the mobile station in the radio coverage area at given instants in response to a first factor;
   measuring means for measuring quality levels of at least one received quality parameter of the radio signals;
   wherein said location means further determines said current location as a function of said quality levels, so that said mobile station is capable of exchanging said radio signals when said quality levels are acceptable; and
   a decision element which compares said quality levels with a predetermined level, and activates said location means when said quality levels are above said predetermined level.

17. The mobile station of claim 16, wherein said measuring means comprise a detection device for detecting a jump in said quality levels.

18. The mobile station of claim 16, wherein said at least one received quality parameter of the radio signals is a received power of said radio signals.

19. A mobile station of a radio transmission system having a radio coverage area for exchanging radio signals with further stations, comprising:
   location means for determining a current location of the mobile station in the radio coverage area at given instants in response to a first factor;
   measuring means for measuring quality levels of at least one received quality parameter of the radio signals;
   wherein said location means further determines said current location as a function of said quality levels, so that said mobile station is capable of exchanging said radio signals when said quality levels are acceptable; and
   a decision element which compares variations of said quality levels with a predetermined level, and activates said location means when said variations are above said predetermined level.

20. The mobile station of claim 19, wherein said measuring means comprise a detection device for detecting a jump in said quality levels.

21. The mobile station of claim 19, wherein said at least one received quality parameter of the radio signals is a received power of said radio signals.

22. A mobile station of a radio transmission system having a radio coverage area for exchanging radio signals with further stations, comprising:
   location means for determining a current location of the mobile station in the radio coverage area at given instants in response to a first factor;
   measuring means for measuring quality levels of at least one received quality parameter of the radio signals;
   wherein said location means further determines said current location as a function of said quality levels, so that said mobile station is capable of exchanging said radio signals when said quality levels are acceptable; and
   a decision element which compares said quality levels with a predetermined level, said decision element including detection means for detecting a current location failure, wherein triggering of said location means to determine said current location as said function of said quality levels is influenced by the detection of the current location failure.

23. The mobile station of claim 22, wherein said measuring means comprise a detection device for detecting a jump in said quality levels.

24. The mobile station of claim 22, wherein said at least one received quality parameter of the radio signals is a received power of said radio signals.

* * * * *